United States Patent [19]

Sawatari et al.

[11] 4,316,191

[45] Feb. 16, 1982

[54] LOW ANGLE RADAR PROCESSING MEANS

[75] Inventors: Takeo Sawatari, Birmingham; Patrick N. Keating, Bloomfield; Ronald F. Steinberg, Livonia, all of Mich.; Rolf K. Mueller, Stillwater, Minn.

[73] Assignee: The Bendix Corporation, Southfield, Mich.

[21] Appl. No.: 140,032

[22] Filed: Apr. 14, 1980

[51] Int. Cl.³ .............................................. G01S 3/06
[52] U.S. Cl. ................................ 343/16 R; 343/5 NQ
[58] Field of Search ................ 343/5 NQ, 16 R, 16 M

[56] References Cited

U.S. PATENT DOCUMENTS

| | | | |
|---|---|---|---|
| 3,189,900 | 6/1965 | Raabe | 343/16 R |
| 3,229,283 | 1/1966 | Hefter et al. | 343/16 R X |
| 3,720,941 | 3/1973 | Ares | 343/16 M X |
| 3,757,326 | 9/1973 | White | 343/16 M X |
| 4,005,421 | 1/1977 | Dax | 343/16 M |
| 4,060,807 | 11/1977 | Barton | 343/16 R X |
| 4,084,160 | 4/1978 | Leuenberger et al. | 343/16 M |
| 4,163,975 | 8/1979 | Guilhem et al. | 343/16 M |

FOREIGN PATENT DOCUMENTS 2408843  7/1979  France ............................ 343/5 NQ Primary Examiner—T. H. Tubbesing
Attorney, Agent, or Firm—W. G. Christoforo; Bruce L. Lamb

[57] ABSTRACT

The elevation angle of a low angle target is accurately measured by subtracting from the received radar signal signals derived from an estimated value of target elevation which reduces the resulting signal to a minimum. The estimated value is an accurate measure of target elevation.

4 Claims, 4 Drawing Figures

LOW ANGLE RADAR PROCESSING MEANS

FIELD OF THE INVENTION

This invention relates to means for determining the elevation angle of near horizon aircraft and more particularly to means for processing radar signals received from near horizon provide improved elevation angle measurement in the presence of ground clutter.

BACKGROUND OF THE INVENTION

In the various systems used for air traffic control such as aircraft traffic control and landing system monitors it is required that precise elevation angle measurements be made. Generally, the elevation angle is measured at a ground station which notes the elevation angle from which a signal reflected from the aircraft is received, in the case where radar signals are transmitted from the ground station and reflected from the aircraft. Elevation angle can also be measured at a ground station which notes the elevation angle from which a transponded signal, transmitted from the aircraft in response to an interrogation signal, is received at the ground station. In any event, whenever the elevation angle is small, that is, whenever the aircraft is close to the horizon of the measuring station, ground reflection of the signals received from the near horizon aircraft complicates the elevation angle measurement process. Specifically, signals reflected from the ground into the ground station receiving antenna when considered with the signals received directly from the target aircraft produce a double target return where one target, corresponding to the real target, appears to be above the radar horizon and another target, corresponding to the ground reflected signals, appears to emanate from a below the horizon target. Generally, the returns from these two targets will merge into a single target return centered about the radar horizon and which may have two discernible peaks. Although it would seem that one could determine the true elevation angle by simply taking half the apparent angle between the two target peaks, such an approach will not provide an accurate measure of the elevation angle. This is true for at least two reasons. First, the apparent below horizon target is not usually a true specular target but will include some ground scattering return, or glint, which will distort the resultant dual target return and introduce an angle error. Second, even if the below horizon target were a true specular target, the addition of the specular target return signal to the true target return signal produces a distorted resulting dual target signal because of the side band content of the various target return signals.

Various prior art techniques have been developed to process signals from low elevation aircraft so as to provide accurate elevation angle measurements. These techniques include what have been characterized as the complex angle technique and multitarget estimation techniques. According to the complex angle technique the phase of the sum and difference voltage patterns of the received signal is measured. The measured phase is compared with a predicted set of calibration values which represent the path traced by the vector for a target as it moves through elevation angles up to about one beamwidth above a known surface. Establishing a reliable set of calibration values is a problem when using this approach in certain environments.

Multitarget estimation is the application of the maximum likelihood estimation technique. According to one advanced embodiment of this technique, the ground receiving station calculates amplitude, phase and direction for each target (3 unknowns for each target, 3 N unknowns for N targets) from the receiving station antenna data. These data contain amplitude and phase information of the wave received by each antenna element (2 measured values for each antenna element; 2 M measured values for M antenna elements). Choosing 2 M to be greater than or equal to 3 N, the 3 N unknowns can be determined by known devices. This embodiment works well when the detector noise is very low such as $-40$ db or lower. The problem with this embodiment is that the high signal to noise ratios implied by such noise figures are seldom if ever attainable in the real world.

Another embodiment of the multitarget estimation technique uses a complex antenna system having such features as time gating (to select one target and reject all other targets except for specular interference), and elimination of elevation angle ambiguity due to the small number of antenna array elements. The influence of specular reflection is reduced as follows. The phase difference of the field received by the end pair of the receiving antenna elements is measured by an interferometer. This phase angle directly corresponds to the elevation angle to be measured. In order to reduce the specular multipath return, a passive spatial filter is introduced which sharply cuts out the signal arriving from a direction below the horizon. The elevation angle measurement accuracy using this embodiment is poor, however, when the target elevation angle is higher than about one antenna beamwidth.

In a proposed third embodiment of this multitarget estimation technique single edge processing is employed. This technique is based on the fact that, as a radar beam is scanned in the elevation plane from high angles to low angles, the leading edge of the beam is not distorted by ground reflections of the main beam. The central location of the beam main lobe, which corresponds to the elevation angle to be measured, is estimated by measuring the beam leading edge location. This technique works well for very high frequency signals (above about 5060.7 MHz) but measurement accuracy deteriorates at lower frequencies.

There are several other techniques for measuring low elevation target angles. However, the ones mentioned above appear to be the best of the prior art techniques.

SUMMARY OF THE INVENTION

The present invention comprises improved means for processing a low elevation target signal received by a radar array by, in essence, subtracting from the received signal signals derived from estimated values of target elevation. The estimated value of target elevation associated therewith is the best estimate of actual target elevation when the resultant signal has a minimum power content. Specifically, the invention provides that the target signal input from each array element be quadrature demodulated to give in-phase and quadrature components, which together define a complex amplitude. There are thus available N complex amplitudes, one for each element of an N array or channel radar. A weight matrix based on a first estimate of the target elevation is applied to the set of N complex amplitudes to generate a new set of N amplitudes, one for each radar channel. The power in each channel associated with the new complex amplitude is computed and the powers in all channels added together and the associated estimate of target elevation noted. From the computed total power and target elevation values a new estimate of target elevation is formed and used to adjust the weight matrix. The weight matrix is again applied to the set of N complex amplitudes and the total power again computed. The whole process is iterated until the smallest power is computed. The elevation angle associated with this power level is the best estimate of target elevation.

DESCRIPTION OF THE PREFERRED EMBODIMENT

Figure 1:
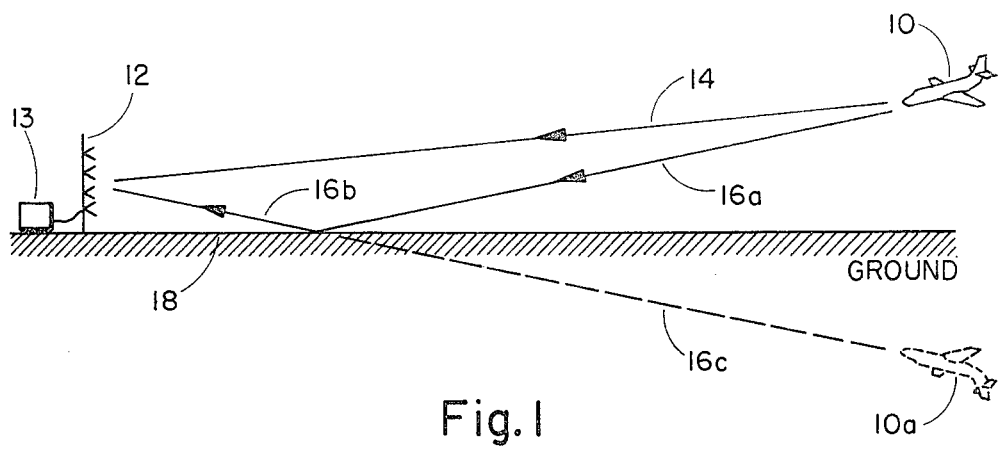
FIG. 1 shows a low angle radar target and illustrates the problem solved by the present invention.

Referring first to FIG. 1, which illustrates the problem solved by the present invention, a low flying aircraft 10, such as an aircraft making a landing approach to a runway, is the source of radar signals which are received by a ground based antenna array 12 which is part of a radar system 13. The radar signals, in this description, are assumed to be secondary radar reply signals originated by a transponder mounted in aircraft 10 which generates the radar signals in response to an interrogation signal transmitted by a remote, usually ground, station. Since aircraft 10 is at a low elevation angle the radar signals are received at antenna array 12 not only directly as by ray 14, but also by a ground bounce ray such as the dual ray 16a and 16b where ray 16b is reflected or bounced off the ground into antenna array 12. Actually, ray 16b appears to be a continuation of an apparent ray 16c which emanates from an imaginary aircraft 10a which is the same distance below ground as real aircraft 10 is above ground.

Figure 2:
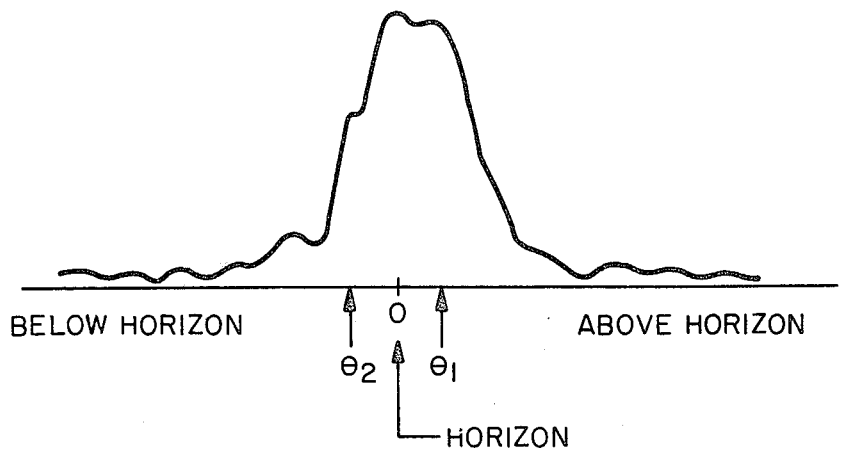
FIG. 2 illustrates a typical radar signal from a low angle target such as the target of FIG. 1.

After conventional temporal processing of the radar signals at the radar system 13 (selection of the proper frequency component), a set of input vectors, the elements of which represent an amplitude and phase of the radar waves incident on antenna array 12, is obtained for each antenna element comprising array 12. The result of conventional beam forming given the above mentioned input vectors is shown in FIG. 2, reference to which should now be made. In FIG. 2 signal return amplitude is plotted against elevation angle and $\theta_1$ and $\theta_2$ are the actual elevation angles of the real and imaginary targets respectively. Of course, the imaginary target appears to be below the horizon for reasons explained above. Since the elevation angles are so low, the real target component of the radar return signal and the component due to the imaginary or specular target overlap around the horizon so that the positive or elevation angle of the real target cannot be accurately determined.

Figure 3:
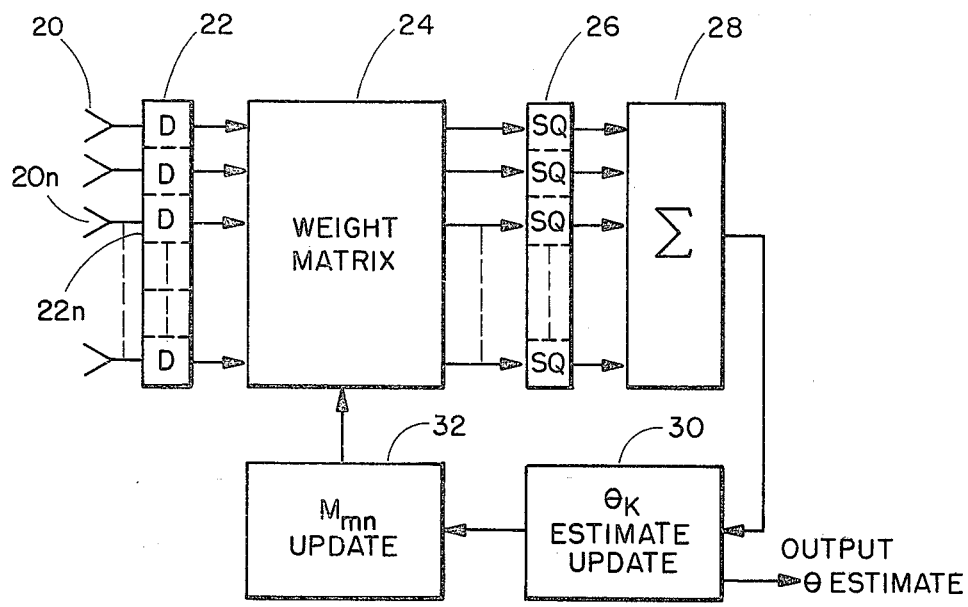
FIG. 3 is a block diagram which illustrates one means for practicing the invention.

The means and method to be described below for determining the true elevation angle of the target aircraft provides for operation on the signal return of FIG. 2 to locate nulls in the vicinity of the horizon. One null will be at $\theta_1$ above the horizon and will locate the elevation angle of aircraft 10 of FIG. 1, while the other null will be at $\theta_2$ below the horizon. Means for carrying out this method is shown in FIG. 3, reference to which should now be made. According to that embodiment an antenna array 20, similar or identical to array 12 of FIG. 1, receives the input radar signals such as those illustrated in FIG. 1. The input radar signal at each antenna array element, for example array element 20n, is quadrature demodulated by one of the demodulators 22, for example, demodulator 22n for antenna element 20n, to give a pair of components, namely, in-phase and quadrature components, which together describe the radar signal incident on that antenna element and which together form a complex amplitude $X_m$, as known to those skilled in the art. The resultant signals are operated on by an adaptive weight matrix 24 whose mathematical value is based, at this time, on a first estimate of $\theta_k$, where $\theta_k$ is a first estimate of target elevation. In practice, weight matrix 24 is applied to the set of N complex amplitudes $X_i$, where $M_{mn}$ is a set of matrix weights and N is the number of antenna elements, to generate a new set of N amplitudes $$X_n' = \sum_m M_{mn} X_m$$

one for each channel comprised of an antenna element and its associated demodulator.

Each of the signals comprising the new set of N amplitudes is individually squared in the square modulus operators 26 to thereby compute the power in each channel and the powers in all channels are added together by summer 28. The sum power is not only memorized in summer 28 but is also applied to a $\theta_k$ estimate update 30 to generate a new value of $\theta_k$ which is applied to matrix update 32 to formulate a new weight matrix which again operates on the outputs from demodulators 22. The process is iterated until the smallest power $P_T$ is memorized in summer 28. The $\theta$ value associated with the value of $P_T$ is the best estimate of target elevation.

Figure 4:
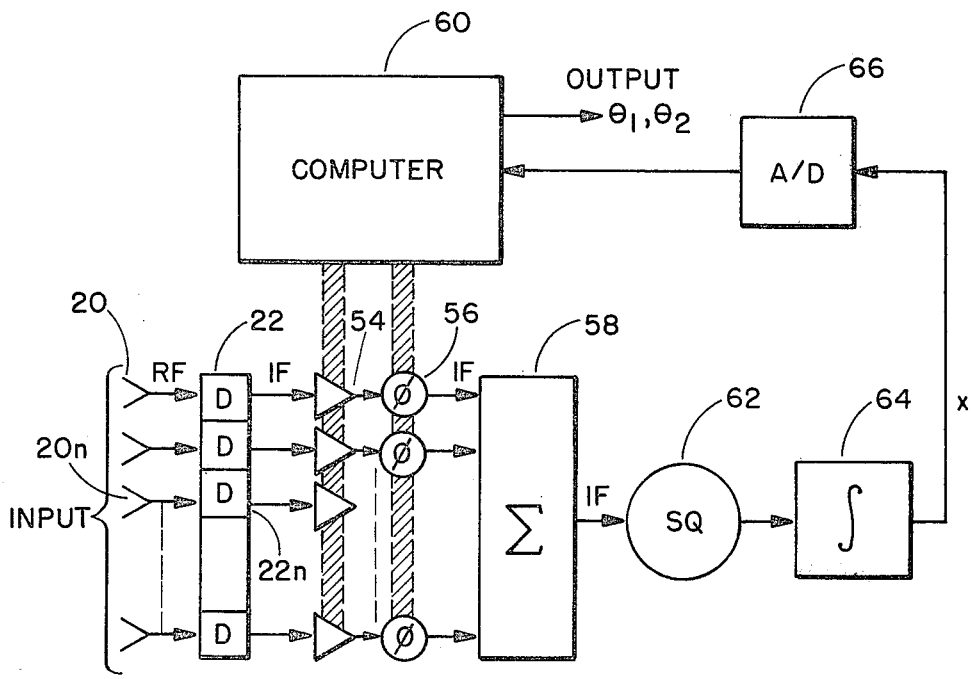
FIG. 4 is another block diagram which illustrates in greater detail means for practicing the invention.

Refer now to FIG. 4 which shows a more detailed schematic of a slightly different form of the invention. As in FIG. 3, 20 represents an antenna array comprised of a set of N sensors or antenna elements upon which the radar signals which are to be processed by the means of the invention are incident. Item 22 represents a set of N heterodyne demodulators. Each demodulator 22 provides the IF in-phase and quadrature components of the radar signal incident on its associated antenna element of its channel, for example, the channel which includes antenna element 20n and demodulator 22n. The resulting set of N-IF signals is acted on by the set of N amplitude weighting elements 54, suitably a set of N amplifiers having variable gain or weighting factors calculated and controlled by computer 60 for reasons to be made clear below. The IF signals are also acted on by the set of N adjustable phase shifters 56, the phase shifts being calculated and controlled also by computer 60. The resulting weighted and phase shifted IF signals are added coherently in summer or adder 58 with the result being squared and thus rectified by squaring circuit 62 and then integrated in integrator 64 to provide a control signal X for computer 60. The control signal is converted to digital format for use in computer 60 by analog to digital converter 66. It should now be apparent that amplifiers 54 and phase shifters 56, taken together, are equivalent to weight matrix 24 of FIG. 3, while squarer 62 and integrator 64 are respectively equivalent to the square modulus operators 26 and summer 28 of FIG. 3.

Integrator 64 integrates the rectified signal from squarer 62 over a predetermined number of equal time periods while computer 60 simultaneously varies the weight factors and phase shifts of amplifiers 54 and phase shifter 56 respectively to new valves for each of the time periods. In this way the integrator output signal, X can be represented by the following mathematical expression:

$$X = \sum_{m=1}^{N} |X_m'|^2 = \sum_{m=1}^{N} \left( \sum_{n=1}^{N} W_{mn} \exp[i\phi_{mn}] \cdot X_n \right)^2$$

where:

$X_n$ (n=1 to N) represents the IF signals, $W_{mn} \exp[i\phi_{mn}] = M_{mn}$ are the complex weights calculated by computer 60 and represented by gain factors $W_{mn}$ and phase shifts $\phi_{mn}$ and are equivalent or identical to the complex weights $M_{mn}$ mentioned above, and, the sum over N is carried out by adder 58 and the sum over M is carried out by integrator 64.

The device of FIG. 4 is similar to a servo loop in that the integrator output $\chi$ is effectively an error signal which the loop strives to minimize. In this regard the analog error signal is reduced to digital format by analog-to-digital converter 66 and then applied to computer 60. Minimization of the error signal provides the best estimate of the elevation angles $\theta_1$ and $\theta_2$ (FIG. 2). The negative angle $\theta_2$ is discarded and the elevation angle $\theta_1$ provided as the computer output.

As mentioned above, the complex weights $M_{mn}$ calculated by computer 60 are represented by gain factors and phase shifts. Complex weights $M_{mn}$ are calculated as follows. First, define the normalized complex amplitude of the incident radar signal for the $n^{th}$ antenna element 20n due to a far field source at an angle $\theta_s$ as:

$$d_{sn} = \exp\left( \frac{2\pi i}{\lambda} A_n \sin \theta_s \right) \quad n = 1, 2 \ldots N,$$

where:

N is the total number of antenna array elements;

$\lambda$ is the wavelength of the incident radar signal; and $A_n$ is the position of the $n^{th}$ antenna element.

From the set of these complex input amplitude there is formed a quantity of interest:

$$H_{rs} = \sum_{n=1}^{N} d_{rn}^* d_{sn} = \sum_{n=1}^{N} \exp\left[ \frac{2\pi i}{\lambda} A_n (\sin \theta_s - \sin \theta_r) \right]$$

where:

r and s correspond to the elevation angles of two signals, the direct-path return (r, s=1) and the ground multipath return (r, s=2).

The set of $H_{rs}$ values ($H_{11}$, $H_{12}$, $H_{21}$, $H_{22}$) forms a 2×2 matrix LH. The inverse of this matrix is $$= \{K_{rs}\} = \phantom{LH}^{-1}.$$

Next form the quantity:

$$B_{mn} = \sum_{r,s=1}^{2} d_{rn}^* \, _{rs} d_{sn}$$

and finally:

$$M_{mn} = \delta_{mn} - B_{mn}$$

where:

$$\delta_{mn} = \begin{array}{l} 1 \text{ if } m = n \\ 0 \text{ if } m \neq n. \end{array}$$

As mentioned above $M_{mn}$ is a complex amplitude which can be factored into the form:

$$W_{mn} \exp(i\phi_{mn})$$

where:

$W_{mn}$ is a real weighting factor and $\phi_{mn}$ is a real phase shift.

If $$N_n = X_n(t)$$

$$n = 1 \text{ to } N$$

are the N signals at IF which are the result of the heterodyne detection by detectors 22 of the microwave signals from antenna elements 20, then a new signal $X_1'(t)$ can be formed by the following operations by amplifier 54 and phase shifters 56:

1. Each IF signal $X_n(t)$ is amplified or weighted by the factor $W_{mn}$ is amplifiers 54 and phase shifted $\phi_{in}$ in phase shifters 56.

2. After every one of the $X_n(t)$ signals is subjected to the operations stated immediately above, the N resulting signals are added coherently in summer 58 to form: $X_1'(t)$.

As also mentioned above $X_1'(t)$ is squared by squarer 62 and $X_1'(t)$ integrated by integrator 64 for a period of time, T. This period is chosen to be an integral number of half cycles of the IF signal. Subsequently, a new signal $X_2'(t)$ is generated by the same means using new weighting factor $W_{2n}$ and phase shifts $\phi_{2n}$ derived from the error signal $\chi$. This new signal is squared and integrated immediately subsequent to the squaring and integration of the previous signal. This process is continued until each of the N signals $X_m'$ have been integrated for a time period T. The output from integrator 64 is digitized by A/D converter 66 and applied to control computer 60 as previously explained.

The weights and phase shifts calculated by computer 60 depend on the two angles $\theta_1$ and $\theta_2$ of FIG. 1. If the radar signal incident on array 20 of FIG. 4 is due to, in essence, two sources, the real target at elevation angle $\theta_1$ and the reflected target at elevation angle $\theta_2$ (specular reflection) then the error signal will be zero. However, in a practical system there will be other sources of radiation incident on the antenna elements such as noise so that the error signal will be greater than zero. The best estimate of $\theta_1$ and $\theta_2$ will be obtained as the error signal is minimized.

Having described our invention and the preferred embodiment thereof, various modifications and alterations should now be apparent to one skilled in the art. Accordingly, we claim as our invention the subject matter covered by the true spirit and scope of the appended claims.

The invention claimed is:

1. Radar equipment for processing electromagnetic signals from a low elevation target including radar means for receiving said electromagnetic signals from said low elevation target directly and via ground bounce comprising:
- an N element array antenna for receiving said electromagnetic signals;
- a set of N detectors of the received electromagnetic signals, each said detector being arranged in a separate channel;
- demodulator means for converting the detected electromagnetic signals into a set of N complex electrical signals $X_m$, one said electrical signal being contained in each said channel;
- a matrix of complex weights $M_{mn}$ responsive to said set of N complex electrical signals $X_m$ for generating a set of N complex electrical signals $X_n'$ where:

$$X_n' = \sum_m M_{mn} X_m;$$

- means for determining the total power represented by said set of N complex electrical signals $X_n'$; and,
- means for iteratively adjusting said complex weights $M_{mn}$ to minimize said total power.

2. The equipment of claim 1 wherein:

$$M_{mn} = \sum_{r,s=1}^{2} d_{rn}^{*} \, _{rs} \, d_{sn}$$

$$H_{rs} = \sum_{n=1}^{N} d_{rn}^{*} d_{sn} = \sum_{n=1}^{N} \exp\left[\frac{2\pi i}{\lambda} A_n (\sin \theta_s - \sin \theta_r)\right]$$

where r and s correspond to the elevation angles of two signals from said low elevation target, respectively the direct-path signal (r, s=1) and the ground multipath signal (r, s=2) so that the set of $H_{rs}$ values ($H_{11}, H_{12}, H_{21}, H_{22}$) forms a 2×2 matrix H, the inverse of which is:

$$_{rs} = \{K_{rs}\} = \phantom{xxx}^{-1}$$

and wherein:

$$B_{mn} = \sum_{r,s=1}^{2} d_{rn}^{*} \, _{rs} \, d_{sn}$$

$$M_{mn} = \delta_{mn} - B_{mn}$$

$$\delta_{mn} = \begin{cases} 1 \text{ if } m = n \\ 0 \text{ if } m \neq n \end{cases}$$

$\lambda$ = the wavelength of the electromagnetic signals
$A_n$ is the position of the $n^{th}$ detector, and the normalized complex amplitude of the electromagnetic signals incident on the $n^{th}$ detector due to said low elevation target at an angle $\theta_s$ is defined as $d_{sn}$ where:

$$d_{sn} = \exp\left(\frac{2\pi i}{\lambda} A_n \sin \theta_s\right) \quad n = 1, 2 \ldots N$$

and, wherein said complex weights are factorable into a real weighting factor $W_{mn}$ and a real phase shift $\phi_{mn}$, said matrix being comprised of means for weighting said complex electrical signals by $W_{mn}$ and for shifting the phase thereof by $\phi_{mn}$.

3. The equipment of claim 1 or 2 wherein said means for determining the total power represented by said set of N complex electrical signals $X_n'$ comprises:
- means for squaring each of the signals $X_n'$ to produce a set of power signals, each of which represents the power content of its parent signal $X_n'$; and,
- means for summing said power signals.

4. The equipment of claim 1 or 2 wherein said means for determining the total power represented by said set of N complex electrical signals $X_n'$ comprises:
- means for summing said N complex electrical signals $X_n'$; and,
- means for squaring the sum of said N complex electrical signals $X_n'$.

* * * * *

UNITED STATES PATENT OFFICE
CERTIFICATE OF CORRECTION

PATENT NO. : 4,316,191

DATED : February 16, 1982

INVENTOR(S) : Takeo Sawatari, Patrick N. Keating, Ronald F. Steinberg, & Rolf K. Mueller It is certified that error appears in the above-identified patent and that said Letters Patent are hereby corrected as shown below:

Column 5, line 60, the mathematical expression should appear as follows:

$$[K_{rs}] = \{K_{rs}\} = [H]^{-1}.$$

line 65, the mathematical expression should appear as follows:

$$B_{mn} = \sum_{r,s=1}^{2} d^{*}_{rn} [K_{rs}] d_{sn}$$

Column 7, line 40, the mathematical expression should appear as follows:

$$[K_{rs}] = \{K_{rs}\} = [H]^{-1}$$

Column 8, lines 4, the mathematical expression should appear as follows:

$$B_{mn} = \sum_{r,s=1}^{2} d^{*}_{rn} [K_{rs}] d_{sn}$$

Signed and Sealed this

Thirteenth Day of July 1982

[SEAL]

Attest:

Attesting Officer

GERALD J. MOSSINGHOFF

Commissioner of Patents and Trademarks